May 20, 1924.
S. KAHN ET AL
SIGNAL FOR AUTOMOBILES
Filed July 27, 1922
1,494,359
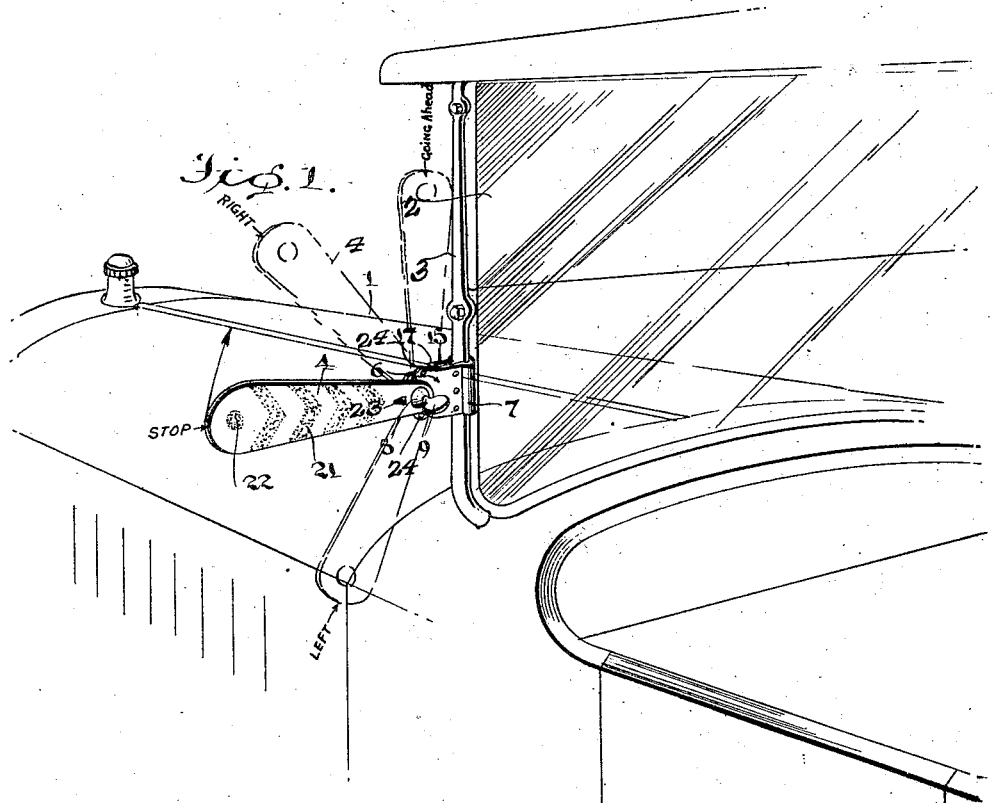
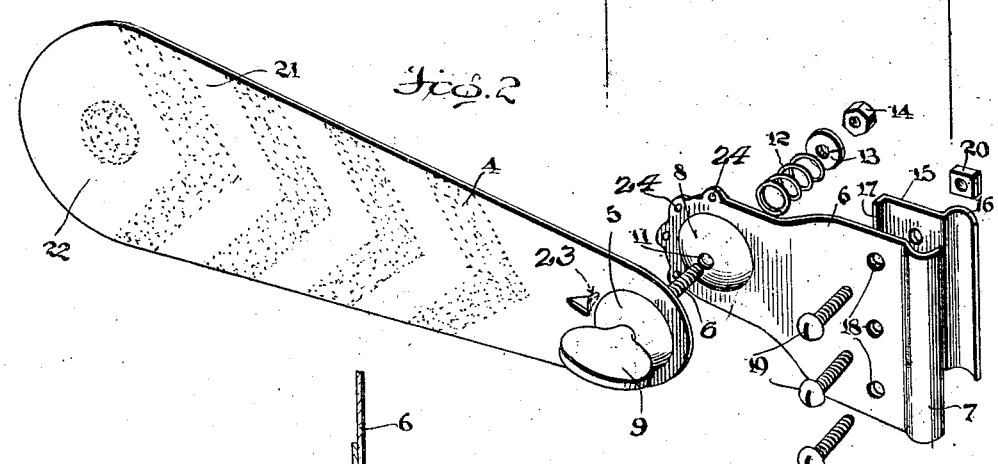
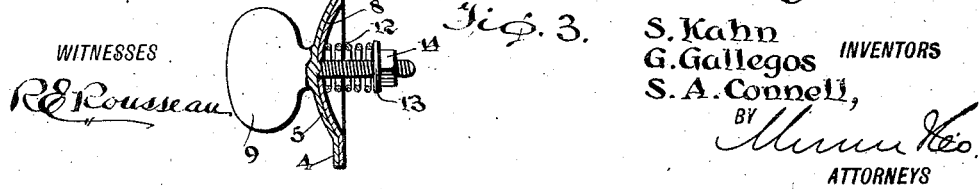
WITNESSES
R.E. Rousseau
S. Kahn
G. Gallegos   INVENTORS
S. A. Connell,
BY
ATTORNEYS Patented May 20, 1924.

1,494,359

UNITED STATES PATENT OFFICE.

SIEGFRIED KAHN, GEORGE GALLEGOS, AND SMITH ALEXANDER CONNELL, OF ALBUQUERQUE, NEW MEXICO.

SIGNAL FOR AUTOMOBILES.

Application filed July 27, 1922. Serial No. 577,832.

*To all whom it may concern:*

Be it known that we, SIEGFRIED KAHN, GEORGE GALLEGOS, and SMITH A. CONNELL, citizens of the United States, and residents of Albuquerque, in the county of Bernalillo and State of New Mexico, have invented a new and useful Improvement in Signals for Automobiles, of which the following is a specification.

Our invention relates to improvements in devices which are adapted to be attached to automobiles and other vehicles and operated by drivers of the vehicles to indicate the intention of a driver to guide the vehicle from a given course either to the right or to the left.

An object of our invention is to provide a signal of the character described which is extremely simple in construction, adapted to be detachably secured to an automobile or like vehicle in position to be conveniently operated by a driver of the vehicle without any change in the ordinary construction of the vehicle being required, and which is not likely to get out of order easily.

Our invention consists in the combinations, constructions and arrangements herein described and claimed and a practical embodiment thereof is illustrated in the accompanying drawings, in which—

Figure 1 is a fragmentary view of the front portion of an automobile equipped with our invention.

Figure 2 is a relatively enlarged perspective view showing the embodiment of our invention detached and the parts thereof disassembled, and Figure 3 is a fragmentary sectional view showing a portion of the embodiment of the invention with the parts thereof in assembled relation.

Referring now to the drawings and particularly to Figure 1 thereof, the numeral 1 designates an automobile of ordinary construction generally provided with a windshield 2 having a frame therefor including a pair of upright or side frame members, such as indicated at 3.

A signal device embodying our invention comprises a blade-like signal member or arm 4 and means for pivotally supporting the arm 4 at its inner end upon a part of the automobile, such as the upright member 3 of the windshield frame, whereby the arm 4 may be swung about a horizontal axis from a horizontal signalling position in which disposed at right angles to the longitudinal axis or direction of movement of the vehicle to a position in which vertically disposed adjacent to the side of the vehicle and out of signalling position. To this end, the signal arm 4 is formed with a convexo-concaved portion 5 extending laterally thereof adjacent to its inner end and being centered in respect to the longitudinal axis of the signal arm. A bracket for attaching the arm 4 to one of the side members of the windshield frame includes a plate section 6 having its inner end portion bent as indicated at 7 to provide a clamp jaw, and having its outer end portion formed to provide a convexo-concaved laterally extending portion 8 which is centered in respect to the longitudinal axis of the plate 6 and is adapted to interfit the convexo-concaved portion 5 of the signal arm 4 so that the proximate or confronting faces of the plate 6 and the arm 4 will be in sliding engagement with each other when the signal arm 4 is swung relatively to the plate 6 about a horizontal axis common to both the convexo-concaved portion 5 and the convexo-concaved portion 8 therein. Extending from the outer or convex face of the portion 5 is a projection or handle 9 which may be the head of a thumb screw or bolt 10 projected through a central opening in the convexo-concaved portion 5 and permanently attached to the latter in any suitable manner as by being welded thereto. The shank of the thumb screw extends laterally of the concaved side of the portion 5 as clearly shown in the drawing and is adapted to extend loosely through a central opening 11 in the convexo-concaved portion 8 of the plate 6. The arm 4 is yieldingly held in adjusted angular relation to the plate 6 by means of an expansion spring 12 coiled about the shank of the screw 10 and reacting at its end against the concaved side of the portion 8 and at its outer end against a lock washer 13 which is held thereagainst by a nut 14 which is in threaded engagement with the shank of the screw or bolt 10 and provides means for adjusting the tension on the spring 12. The bracket for supporting the arm 4 on one of the side frame members 3 includes a second plate section 15 having a jaw portion 16 at one end complemental to the jaw portion 7 and having a laterally extending flange 17 at its other end. The plates 6 and 15 are provided with bolt receiving openings 18 and 19 respectively, corresponding openings 18 and 19 being in alignment when the outer edge of the flange 17 is in abutting relation to the one face of the section 6 and the jaws 7 and 16 are in cooperating relation. Bolts 19′ may be projected through the aligned openings in the plate sections of the bracket and nuts 20 and screwed on the ends thereof against the proximate plate section to clamp the jaws 7 and 16 in embracing relation to one of the side or upright members 3 of the windshield frame.

From the foregoing description of the various parts of the device, the operation thereof may be readily understood. Signalling devices embodying our invention as hereinbefore described may be attached to both sides or either side of a windshield frame of an automobile or similar fixed part or parts of an automobile or like vehicle. When the embodiment of the invention illustrated is used in actual practice, it is attached to the side of the frame at which the steering wheel of the vehicle is positioned. When in inactive position during a direct forward movement of the vehicle, the signal arm 4 is in upright position adjacent to the side member of the windshield frame to which attached. When the driver of the automobile intends to turn from a straight forward direction, the handle 9 is grasped and rotated until the arm 4 has been swung outwardly and downwardly about the axis of the screw or bolt 10 into horizontal position, as shown in Figure 1. The action of the spring 12 will cause sufficient friction between the contiguous portions of the plate 6 and the arm 4 to hold the arm 4 in the position to which moved with respect to the plate section 6, while at the same time the friction is not sufficient to interfere with the operation of the arm 4 in the manner described. In order to draw attention to the signal arm when it has been moved to active position, a series of V-shaped stripes or lines 21 are produced upon opposite faces of the arm in colors such as red, which will render the arm conspicuous. To aid in drawing the attention of interested persons to the arm 4, a spot 22 may be produced on each face of the arm 4 adjacent to the outer end thereof with the stripes 21 and in any color which will be conspicuous. While we have shown the arm 4 as being provided with a handle 9 which is adapted to be grasped to effect movement of the arm from active to inactive positions or vice versa, it will be obvious that suitable known means, not shown, may be arranged between the arm 4 and the steering wheel or other control of the automobile to which the device is attached, whereby the operation of such control means of the vehicle will occasion a desired movement of the signal arm.

The arm 4 is provided with a projection or finger 23 adapted to engage openings or indentations 24 which are provided at determined points on the plate 6 whereby the arm 4 may be releasably held in a plurality of positions selectively, so as to indicate different signals to observers. For example, the arm 4 may be held upright to indicate the intention of the driver to proceed straight ahead, upwardly inclined at an angle of 45° to the horizontal to indicate the intention of the driver to turn to the right, in horizontal position to indicate the intention of the driver to stop and in a position inclined downwardly at an angle of 45° from the horizontal to indicate the intention of the driver to turn to the left. The various positions may indicate different signals in different localities.

Moreover, modifications and adaptations of the device illustrated herein may be obviously made without departing from the spirit and scope of our invention and we therefore consider as our own all such modifications and adaptations which fairly fall within the scope of the claims.

We claim:—

1. A signal device of the character described comprising a signal arm having a convexo-concaved portion extending laterally of one face thereof, a bracket comprising a pair of adjustably connected clamping jaws and an extending portion having a convexo-concaved portion adapted to interfit the first named convexo-concaved portion when the said signal arm and the extending portions are arranged in flatwise contiguous relation, a pivot member extending from the convexed side of the first named convexo-concaved portion through the center of the latter and through a central opening in the second named convexo-concaved portion, and means carried by the pivot member and engaging the inner side of the second-named convexo-concaved portion to yieldingly resist movement of the signal arm about the axis of the pivot member.

2. A signal device of the character described comprising a signal arm having a convexo-concaved portion extending laterally of one face thereof, a bracket comprising a pair of adjustably connected clamping jaws and an extending portion having a convexo-concaved portion adapted to interfit the first named convexo-concaved portion when the said signal arm and the extending portions are arranged in flatwise contiguous relation, a pivot member extending from the convexed side of the first named convexo-concaved portion through the center of the latter and through a central opening in the second named convexo-concaved portion, and spring means held on the pivot member in contact with the concaved face of the second named convexo-concaved portion to yieldingly hold the said convexo-concaved portions in frictional engagement with each other.

SIEGFRIED KAHN.
GEORGE GALLEGOS.
SMITH ALEXANDER CONNELL.